United States Patent [19]
Schremmer et al.

[11] Patent Number: 5,442,943
[45] Date of Patent: Aug. 22, 1995

[54] STEERING LOCK FOR MOTOR VEHICLES

[75] Inventors: Gottfried Schremmer, Tsmm; Karl Peitsmeier, Aldingen, both of Germany

[73] Assignee: Mercedes-Benz AG, Stuttgart, Germany

[21] Appl. No.: 159,867

[22] Filed: Dec. 1, 1993

[30] Foreign Application Priority Data

Dec. 1, 1992 [DE] Germany .................. 42 40 283.2

[51] Int. Cl.⁶ ................... B60R 25/02; E05B 15/02
[52] U.S. Cl. ........................... 70/252; 70/371; 70/381; 70/422; 70/452
[58] Field of Search ............... 70/252, 422, 367–371, 70/381, 452, 183–186

[56] References Cited

U.S. PATENT DOCUMENTS

| | | | |
|---|---|---|---|
| 2,000,829 | 5/1935 | Falk | 70/369 |
| 2,059,695 | 11/1936 | Jacobi | 70/369 |
| 2,079,583 | 5/1937 | Brauning | 70/368 |
| 3,287,944 | 11/1966 | Crumb | 70/370 |
| 3,722,243 | 3/1973 | Schiesteri | 70/370 X |
| 3,859,828 | 1/1975 | Ibuka et al. | 70/252 |
| 3,919,867 | 11/1975 | Lipschutz et al. | 70/371 X |
| 4,397,167 | 8/1983 | Maiocco | 70/370 |
| 4,400,954 | 8/1983 | Nakamoto | 70/370 X |
| 5,077,994 | 1/1992 | Trull et al. | 70/368 X |

FOREIGN PATENT DOCUMENTS

| | | | |
|---|---|---|---|
| 1553372 | 9/1969 | Germany | 70/452 |
| 2053775 | 2/1974 | Germany . | |
| 2366072 | 9/1977 | Germany | 70/368 |
| 7919938 | 9/1980 | Germany . | |
| 1340968 | 12/1973 | United Kingdom . | |

OTHER PUBLICATIONS

Search Report.

*Primary Examiner*—Lloyd A. Gall
*Attorney, Agent, or Firm*—Evenson McKeown Edwards & Lenahan

[57] ABSTRACT

In a steering lock for motor vehicles, a lock cylinder having a rotor and a stator is received in a tubular steering lock housing. A tubular end section of the lock housing and lock cylinder is enclosed by a pot-shaped cap made from a high strength material. In the steering lock housing, in a radially displaceable arrangement, there is mounted at least one locking element which is spring-biased in the radial outward direction to protrude into an inner ring groove of the cap to prevent axial displacement of the cap when in a locked position. The at least one locking element can be slid, in a certain rotational setting of the rotor, into a notch in the rotor and can thereupon be moved out of the inner groove of the cap. For this displacement of the locking element into the notch of the rotor, there is secured along the base of the inner groove a circumferential spring wire. The spring wire exhibits, for each locking element, a wire section which is formed out radially up to the margin of the groove; this wire section, if the rotor setting is incorrect and the notch is not assigned to the locking element, being able to be bent elastically up to the base of the inner groove.

8 Claims, 2 Drawing Sheets

STEERING LOCK FOR MOTOR VEHICLES

BACKGROUND AND SUMMARY OF THE INVENTION

The invention relates to a steering lock for motor vehicles in which a lock cylinder having a rotor and a stator is received in a steering lock housing having a tubular end section. A pot-shaped cap of high-strength material surrounds the tubular end section of the steering lock housing.

From German Patent Specification 2 053 775, a steering lock of this type is known which is protected from outside by a particularly stable cap and demonstrates no visible access to the interior of the steering lock. For the detention of the cap, a bolt-shaped locking element engages in an inner grooved ring of the cap. For the return guidance into an unlocking position, the locking element head in the grooved ring and the grooved ring are provided with bevels which act as guide surfaces and, when the cap is pulled off, transport the locking element into a setting displaced into the notches on the rotor. In this case, this bevel also however opens up the possibility of violently interfering with the locking element in a locking position of the locking element by pulling powerfully upon the cap, which could then cause damage to the rotor or to the sensitive tumblers on the rotor. Even if there is a failure to pull the cap right off, the steering lock could still be damaged and any operation of the steering lock using the vehicle key rendered impossible.

An anti-theft device on a steering lock is likewise known from German patent document DE-UM 79 19 938, in which a bearing surface of the locking element, which bearing surface lies parallel to the direction of displacement, is provided on the cap groove, the configuration of the anti-theft device providing, however, an unlocking position which can only be reached using a special tool which has to be introduced from outside through a bore. It is disadvantageous in this case that any authorized person who would like, for example, to repair the lock must also be in possession of the special tool and, moreover, that the lock cylinder, which is accessible from outside through the bore, also allows the interior of the lock to be manipulated, contradictory to the protective function of the cap.

An object of the invention is to protect a steering lock of the generic type better against unauthorized tampering.

This object is achieved according to the invention by providing a steering lock for motor vehicles in which a lock cylinder having a rotor and a stator is received in a tubular steering lock housing having a tubular end section and comprising:

- a pot-shaped cap made from a high-strength material and surrounding the tubular end section of the lock housing, said cap having a central access for a vehicle key,
- at least one locking element mounted in the steering lock housing, said at least one locking element being spring-biased in a radial outward direction and being radially displaceable between a locking position protruding into an inner ring groove of the cap to prevent axial displacement of the cap and an unlocking position, in a predetermined rotational setting of the rotor out of the inner groove of the cap, into a notch in the rotor, and
- a circumferential spring wire secured along a base of the inner groove, said spring wire exhibiting for each locking element a wire section which is formed out radially up to a margin of the inner groove and by virtue of which the locking element can be displaced towards the rotor and which can be bent elastically up to the base of the inner groove.

A pot-shaped cap made from a high-strength material protects the lock cylinder in the steering lock housing from non-permitted alterations to the locking state brought about by a vehicle key. This cap is fastened on the steering lock housing in such a way that, from outside and by virtue of the cap itself, no manipulation of the steering lock is enabled. For this purpose, the cap exhibits on the inside a ring groove into which there protrudes a locking element which is spring-biased in the radially outward direction and prevents axial displacement of the cap and which is mounted displaceably in the steering lock housing and, in a certain rotational setting of the rotor, can be slid into a notch in the rotor and can thereupon be moved out of the inner groove of the cap. The locking element is moved back into its unlocking position by a spring wire skirting along the foot of the inner groove, in that an elastically flexible wire section of the spring wire, which wire section is formed out in radial relief, displaces the locking element into the notch of the rotor whenever the cap is twisted. Twisting of the cap without an appropriate rotational setting of the rotor, in which the notches allow displacement of the locking elements, does not lead to an inadmissible exertion of force upon the locking element or lock cylinder, since the elastically flexible wire section is in this case elastically deformed in the direction of the foot of the inner groove by the non-yielding locking element, then stands up again in relief and is able to assume its displacement function when the rotor is twisted.

As a result of the cap being axially pressurized, no radial force is able to act upon the locking element, since the locking element exhibits, parallel with the side walls of the inner groove, supporting faces lying parallel to the direction of displacement.

In order to support the spring-biased displacement of the locking elements into their locking position, the notch in the rotor can be configured as a guiding edge for the locking element, by which the locking element, whenever the rotor is twisted by the vehicle key, is moved radially outwards into the inner groove of the cap. For this, a notch is suitable which is semi-circular in rotor cross-section and which is matched in its shape to the engagement curvatures of the locking element.

A uniform holding force for the detention of the cap on the steering lock housing is obtained in especially preferred embodiments by virtue of two radially opposing locking elements to which there are assigned two wire sections which are formed out opposite each other in relief for their displacement into the unlocking position.

Other objects, advantages and novel features of the present invention will become apparent from the following detailed description of the invention when considered in conjunction with the accompanying drawings.

DETAILED DESCRIPTION OF THE DRAWINGS

Figure 1:
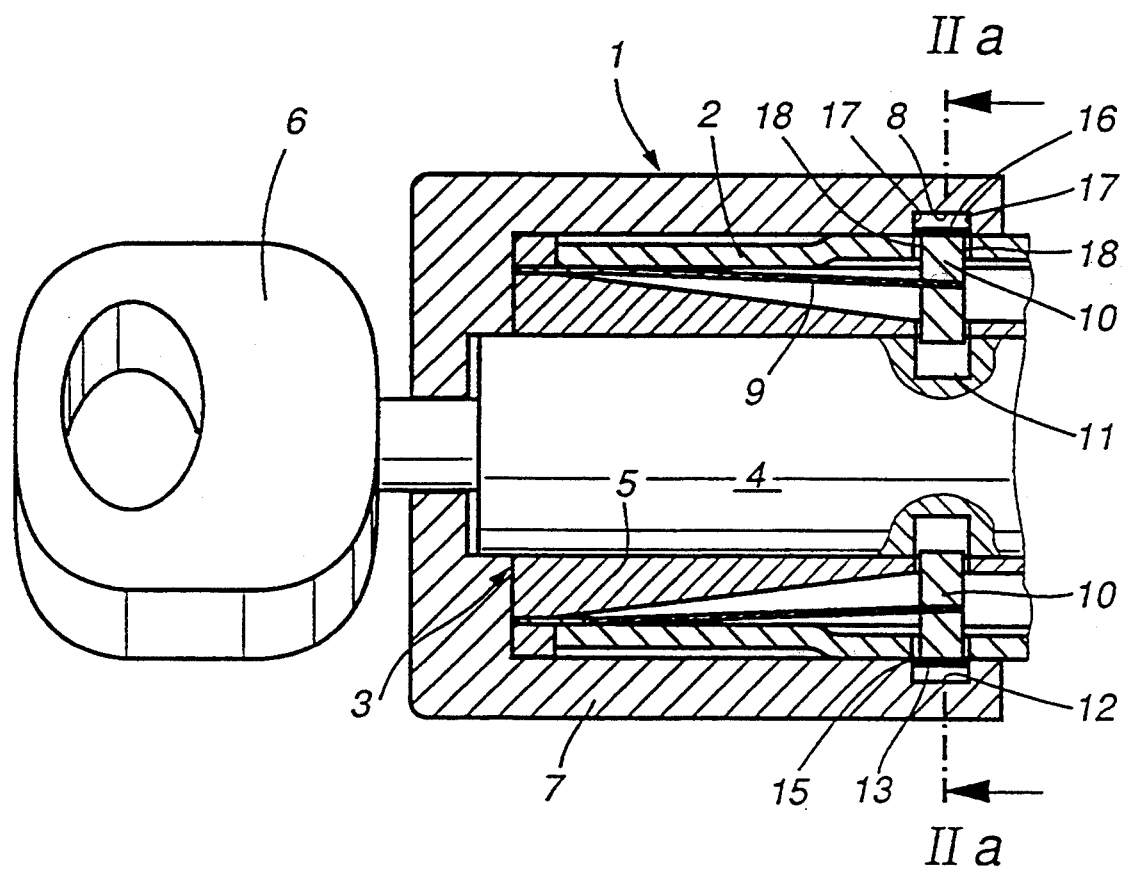
FIG. 1 is a schematic longitudinal sectional view showing a steering lock housing having a removable cap, with the locking elements in the unlocking position, constructed according to a preferred embodiment of the invention.

In FIG. 1 there is represented an end section of a steering lock 1 for a motor vehicle, which steering lock comprises a tubular steering lock housing 2 and, therein, a lock cylinder 3 having a rotatable rotor 4 and a fixed stator 5. An access opening is covered, apart from a recess for a vehicle key 6, by a pot-shaped cap 7 made from a high-strength material, which cap envelops the steering lock housing and spaced a small radial distance therefrom the cap 7 protects the steering lock 1 against unauthorized interference by preventing access to the lock cylinder 3 without the vehicle key 6.

Figure 2A:
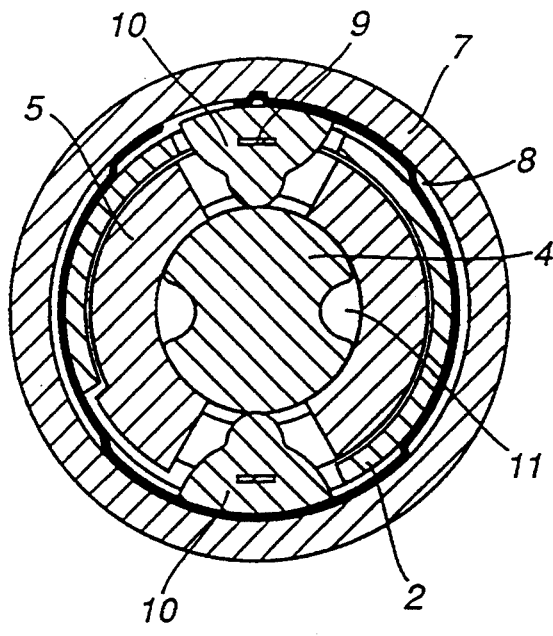
FIG. 2a shows the cross-section along the line IIa—IIa from FIG. 1, yet with the locking elements in the locking setting, which is displaced radially outwards.

The cap 7 exhibits on the inside a ring groove 8 into which there protrude, as represented in FIG. 2a, two locking elements 10, which prevent axial displacement of the cap 7 and are biased radially outwards in each case by a leaf spring 9 attached to the stator 5 in an articulated fashion.

Figure 2B:
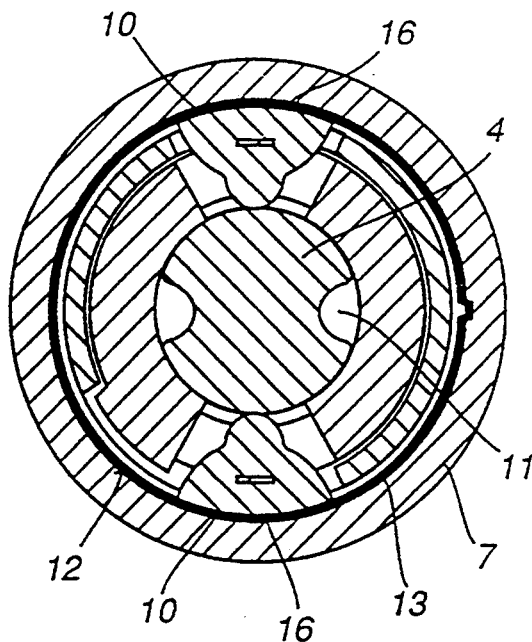
FIG. 2b shows the cross-section along the line IIa—IIa from FIG. 1, yet with the locking elements in the locking setting and exhibiting elastically yielded wire sections, the cap having been twisted.
Figure 2C:
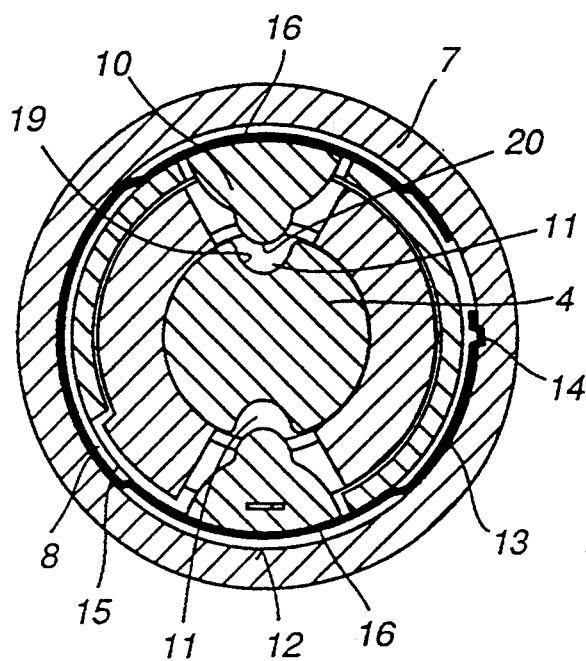
FIG. 2c shows the cross-section along the line IIa—IIa according to FIG. 1, with the locking elements in the unlocking position.

Moreover, the locking elements 10 are mounted displaceably in the steering lock housing 2 and, as can be seen from FIG. 2c, can be slid, in a certain rotational setting of the rotor 4, respectively into a notch 11 in the rotor casing and can thereupon be moved out of the inner groove 8 of the cap 7, after which the cap 7 can be removed. For this, a circumferential spring wire 13 having a wire boss 14 or the like is secured along the foot or base 12 of the inner groove 8, which spring wire exhibits elastically flexible wire sections 16 which are formed out radially up to the margin 15 of the inner groove. By virtue of the spring wire 13, each locking element 10 can be displaced into the notches 11 in the rotor 4, when the cap 7 and rotor 4 are twisted or rotated with respect to one another and provided that the notches 11 are appropriately positioned. These notches 11 can only be rotated into the correct position using the vehicle key 6.

Should the notches 11 not be located in the correct position aligned with respective locking elements 10, as represented in FIG. 2b, then rotating of the cap 7 causes the elastically flexible wire sections 16 to yield elastically against the foot 12 of the groove as a result of the spring wire 13 running up against the locking elements. This closes a gap in the spring wire 13, thereby preventing any force being exerted upon the locking elements 10 or by these upon the rotor 4. Following further rotating of the cap 7, the wire sections 16 reoccupy their raised position and can subsequently resume their unlocking function upon the appropriate operation of the steering lock 1 using the vehicle key 6.

To ensure that no displacement of the locking elements 10 towards the rotor 4 or violent damage to the lock cylinder 3 is brought about, even when axial traction is exerted upon the cap 7, the locking elements 10 respectively exhibit bearing surfaces 18 which lie parallel to the direction of displacement of the locking elements and to the side walls 17 of the inner groove and engage in the inner groove 8.

The notch 11 in the rotor 4 can comprise a guiding edge 19 for the displacement of the locking element 10 towards the inner groove 8, by virtue of which guiding edge the locking element 10 engaging in the notch 11, whenever the rotor 4 is twisted by means of the vehicle key 6, and supported by the leaf spring 9, is displaced radially outwards. For this operation, the locking element 10 can exhibit an engagement curvature 20 conforming to the shape of the notch 11 in the rotor 4.

By virtue of two radially opposing locking elements 10 to which there are assigned two wire sections 16 of the spring wire 13, these wire sections being disposed radially opposite each and being formed by respective sections bent away from adjacent portions of the spring wire, the holding force of the locking elements 10 is transmitted uniformly into the cap on opposite sides.

Figure 2D:
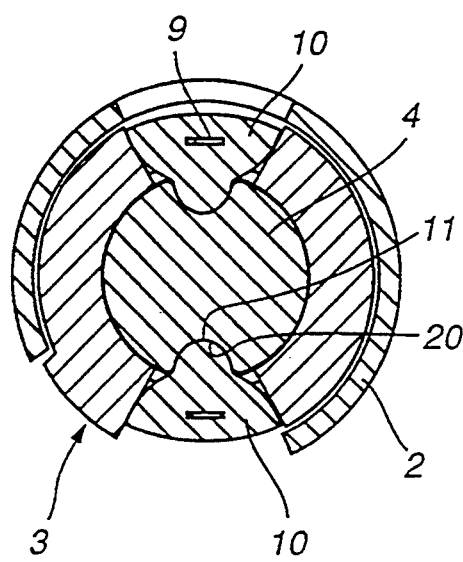
FIG. 2d shows the cross-section along the line IIa—IIa from FIG. 1, yet with the locking elements in a position which is suitable for the dismantling of the lock cylinder when the cap is removed and which is recessed further in the rotor.

FIG. 2d shows that in order to dismantle the lock cylinder 3 from the steering lock housing 2, the locking elements 10 are displaced with their engagement curvatures 20 far enough into the notches 11 to prevent them from jutting out over the periphery of the lock cylinder 3. This setting can be brought about, once the cap 7 has been lifted off, by the locking elements 10 being manually pressed in, against the spring force of the leaf spring 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Steering lock for motor vehicles, in which a lock cylinder having a rotor and a stator is received in a tubular steering lock housing having a tubular end section, comprising:

a pot-shaped cap made from a high-strength material and surrounding the tubular end section of the lock housing, said cap having a central access for a vehicle key, at least one locking element mounted in the steering lock housing, said at least one locking element being spring-biased in a radial outward direction and being radially displaceable between a locking position protruding into an inner ring groove of the cap to prevent axial displacement of the cap and an unlocking position, in a predetermined rotational setting of the rotor out of the inner groove of the cap, into a notch in the rotor, and a circumferential spring wire secured along a base of the inner groove, said spring wire exhibiting for each locking element a wire section which is formed out radially up to a margin of the inner groove and by virtue of which the locking element can be displaced towards the rotor and which can be bent elastically up to the base of the inner groove.

2. Steering lock according to claim 1, wherein the at least one locking element exhibits bearing surfaces which extend parallel to the direction of displacement of the locking element and to side walls of the inner groove and engage in the inner groove.

3. Steering lock according to claim 2, wherein two wire sections are assigned to two radially opposing locking elements, said wire sections being disposed radially opposite one another and being formed by respective sections bent away from adjacent portions of the spring wire.

4. Steering lock according to claim 1, wherein two wire sections are assigned to two radially opposing locking elements, said wire sections being disposed radially opposite one another and being formed by respective sections bent away from adjacent portions of the spring wire.

5. Steering lock according to claim 1, wherein the notch is configured as a guiding edge for the displacement of a locking element towards the inner groove.

6. Steering lock according to claim 5, wherein each of the at least one locking element exhibits engagement curvatures matching the shape of the notch. in the rotor.

7. Steering lock according to claim 5, wherein two wire sections are assigned to two radially opposing locking elements, said wire sections being disposed radially opposite one another and being formed by respective sections bent away from adjacent portions of the spring wire.

8. Steering lock according to claim 6, wherein two wire sections are assigned to two radially opposing locking elements, said wire sections being disposed radially opposite one another and being formed by respective sections bent away from adjacent portions of the spring wire.

* * * * *